United States Patent
Lee et al.

(10) Patent No.: US 7,635,215 B2
(45) Date of Patent: Dec. 22, 2009

(54) OPTICAL SHEET AND BACKLIGHT UNIT USING THE SAME

(75) Inventors: Man Hoan Lee, Gumi-si (KR); Won Taek Moon, Gyeongsangbuk-do (KR); Jae Hyun Park, Busan-si (KR)

(73) Assignee: LG Display Co., Ltd., Seoul (KR)

( * ) Notice: Subject to any disclaimer, the term of this patent is extended or adjusted under 35 U.S.C. 154(b) by 239 days.

(21) Appl. No.: 11/476,848

(22) Filed: Jun. 29, 2006

(65) Prior Publication Data

US 2007/0153544 A1 Jul. 5, 2007

(30) Foreign Application Priority Data

Dec. 29, 2005 (KR) ................. 10-2005-0134412

(51) Int. Cl.
*G02B 5/02* (2006.01)
(52) U.S. Cl. .................. 362/607; 362/19; 359/599
(58) Field of Classification Search .......... 362/559, 362/19, 558, 355, 606, 607, 330, 311, 326, 362/331, 332; 359/599, 619; 349/64, 65
See application file for complete search history.

(56) References Cited

U.S. PATENT DOCUMENTS

| 6,606,133 | B1 * | 8/2003 | Okabe ................. 349/65 |
| 6,798,574 | B2 * | 9/2004 | Kim ................... 359/566 |
| 7,297,380 | B2 * | 11/2007 | Coenjarts et al. ......... 428/1.3 |
| 7,327,415 | B2 * | 2/2008 | Brickey et al. ........... 349/64 |
| 2003/0123150 | A1 * | 7/2003 | Brickey et al. .......... 359/599 |
| 2006/0146577 | A1 * | 7/2006 | Hsieh et al. ............ 362/633 |
| 2008/0284942 | A1 * | 11/2008 | Mahama et al. .......... 349/64 |

FOREIGN PATENT DOCUMENTS

| CN | 1930516 A | 3/2007 |
| EP | 1 780 461 A1 * | 8/2005 |
| EP | 1 780 461 A1 | 5/2007 |

* cited by examiner

*Primary Examiner*—Bao Q Truong
(74) *Attorney, Agent, or Firm*—Morgan Lewis & Bockius LLP

(57) ABSTRACT

An optical sheet and a backlight unit using the same are disclosed, in which deviation of a viewing angle is minimized to improve picture quality. The optical sheet includes a diffusion sheet provided with a plurality of diffusion patterns diffusing incident light in at least two directions to allow the incident light to have different strengths.

8 Claims, 19 Drawing Sheets

Irradiate Light

Irradiate Light

Irradiate Light

Irradiate Light

Irradiate Light

OPTICAL SHEET AND BACKLIGHT UNIT USING THE SAME

This application claims the benefit of the Korean Patent Application No. P2005-134412, filed on Dec. 29, 2005, which is hereby incorporated by reference.

BACKGROUND OF THE INVENTION

1. Field of the Invention

The present invention relates to a liquid crystal display (LCD) device, and more particularly, to an optical sheet and a backlight unit using the same in which deviation of a viewing angle is minimized to improve picture quality.

2. Discussion of the Related Art

Recently, various flat panel displays have been developed with reduced weight and volume as compared to a cathode ray tube device. Examples of the flat panel displays include liquid crystal display (LCD) devices, field emission display (FED) devices, plasma display panel (PDP) devices, and light emitting display (LED) devices.

The LCD device displays desired images by controlling light from a backlight unit using an LCD panel. The LCD panel includes a plurality of liquid crystal cells and a plurality of control switches for switching video signals supplied to the respective liquid crystal cells. The backlight unit includes prism and diffusion sheets that can efficiently condense and diffuse light.

Hereinafter, related art prism and diffusion sheets will be described with reference to the accompanying drawings. FIG. 1 illustrates the related art prism and diffusion sheets.

As shown in FIG. 1, a related art prism sheet 11 includes a condensing sheet 12, and a plurality of prism peaks 13 formed on the condensing sheet 12. Each of the prism peaks 13 has a triangular prism shape and their apexes are arranged on the condensing sheet 12 opposing a diffusion sheet 10. The prism peaks 13 condense light emitted from a lamp and transmit the condensed light to the diffusion sheet 10.

The prism sheet 11 more efficiently condenses either light diffused in an X-axis direction or a Y-axis direction along an arrangement direction of the prism peaks 13. Specifically, the prism sheet 11 efficiently condenses light diffused in a tilt direction of the prism peaks 13, i.e., in a Y-axis direction of FIG. 1. By contrast, the prism sheet 11 fails to efficiently condense light diffused in a longitudinal direction of the prism peaks 13, i.e., an X-axis direction of FIG. 1. Accordingly, the light which has passed through the prism sheet 11 is less diffused in the Y-axis direction because it is well condensed. However, the light is much more diffused in the X-axis direction because it is not well condensed.

Afterwards, the light which has passed through the prism sheet 11 passes through the diffusion sheet 10 and is then irradiated toward a rear surface of an LCD panel. At this time, since the condensing efficiency depends on each direction, the light irradiated toward the rear surface of the LCD panel causes the following problems.

FIG. 2 illustrates viewing angle characteristics depending on the condensing efficiency. As described above, since the light is not well condensed in the X-axis direction but is more efficiently condensed in the Y-axis direction, a viewing angle $\theta1$ in the X-axis direction from the rear surface of the LCD panel is wide but a viewing angle $\theta2$ in the Y-axis direction is narrow. A problem occurs in that picture quality is degraded due to deviation between the viewing angle $\theta1$ in the X-axis direction and the viewing angle $\theta2$ in the Y-axis direction. Generally, the viewing angle $\theta1$ in the X-axis direction is about 45° while the viewing angle $\theta2$ is about 32°.

SUMMARY OF THE INVENTION

Accordingly, the present invention is directed to an optical sheet and a backlight unit using the same which substantially obviate one or more problems due to limitations and disadvantages of the related art.

An object of the present invention is to provide an optical sheet and a backlight unit using the same that minimize deviation in the viewing angle.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an optical sheet according to the present invention includes a diffusion sheet provided with a plurality of diffusion patterns diffusing incident light in at least two directions to allow the incident light to have different strengths.

In another aspect of the present invention, an optical sheet includes at least one diffusion sheet provided with a plurality of diffusion patterns diffusing incident light in at least two directions to allow the incident light to have different strengths, and a brightness enhancement sheet arranged on at least one surface of the diffusion sheet, enhancing brightness of the light.

In still another aspect of the present invention, a backlight unit includes at least one light source emitting light, a light guide plate emitting surface light through an incident surface using the light emitted from the light source, a lamp housing arranged to fix the light source, condensing the light emitted form the light source to the incident surface of the light guide plate, a reflecting plate arranged below the light guide plate to reflect the light, a prism sheet arranged above the light guide plate to condense the light emitted to the light guide plate, and at least one diffusion sheet arranged above the prism sheet and provided with a plurality of diffusion patterns diffusing the light from the prism sheet in at least two directions to allow the light to have different strengths.

In further still aspect of the present invention, a backlight unit includes at least one light source emitting light, a bottom cover receiving and supporting the light source, a prism sheet condensing the light emitted from the light source and emitting the condensed light, and at least one diffusion sheet arranged above the prism sheet and provided with a plurality of diffusion patterns diffusing the light from the prism sheet in at least two directions to allow the light to have different strengths.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts. Hereinafter, an optical sheet and a backlight unit using the same according to the embodiment of the present invention will be described with reference to the accompanying drawings.

Figure 3:
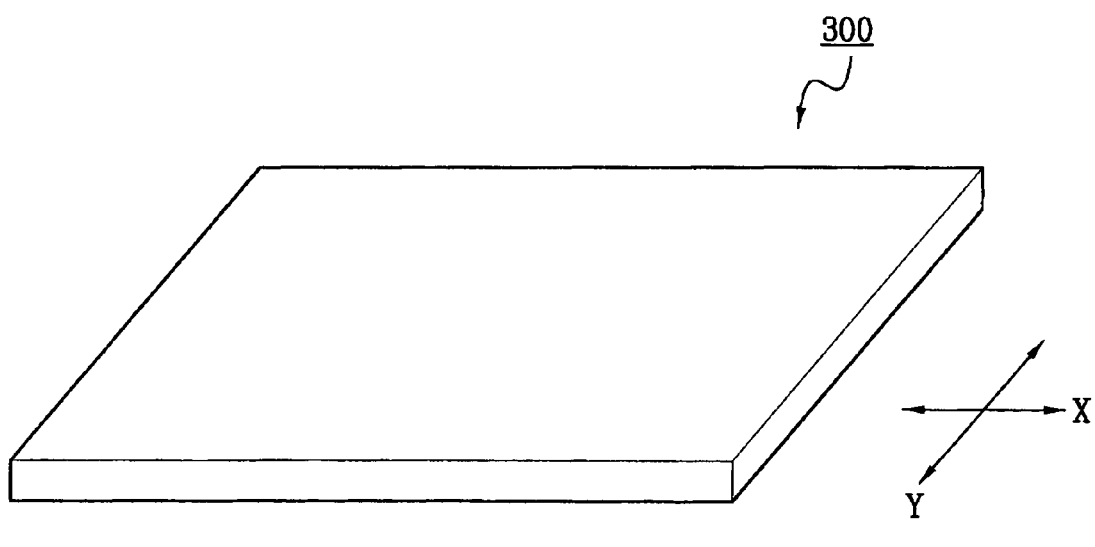
FIG. 3 illustrates a diffusion sheet in a backlight of an LCD device according to an exemplary embodiment of the present invention.
Figure 3:
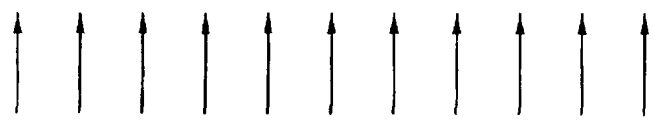

FIG. 3 illustrates a diffusion sheet in a backlight of an LCD device according to an exemplary embodiment of the present invention.

The diffusion sheet 300 of FIG. 3 diffuses incident light in at least two directions so that the incident light has different strengths. That is, the diffusion sheet 300 diffuses the incident light in the X-axis and the Y-axis directions. Thus, the incident light has a first strength in the X-axis direction and a second strength in the Y-axis direction. The diffusion sheet 300 will now be described.

Figure 1:
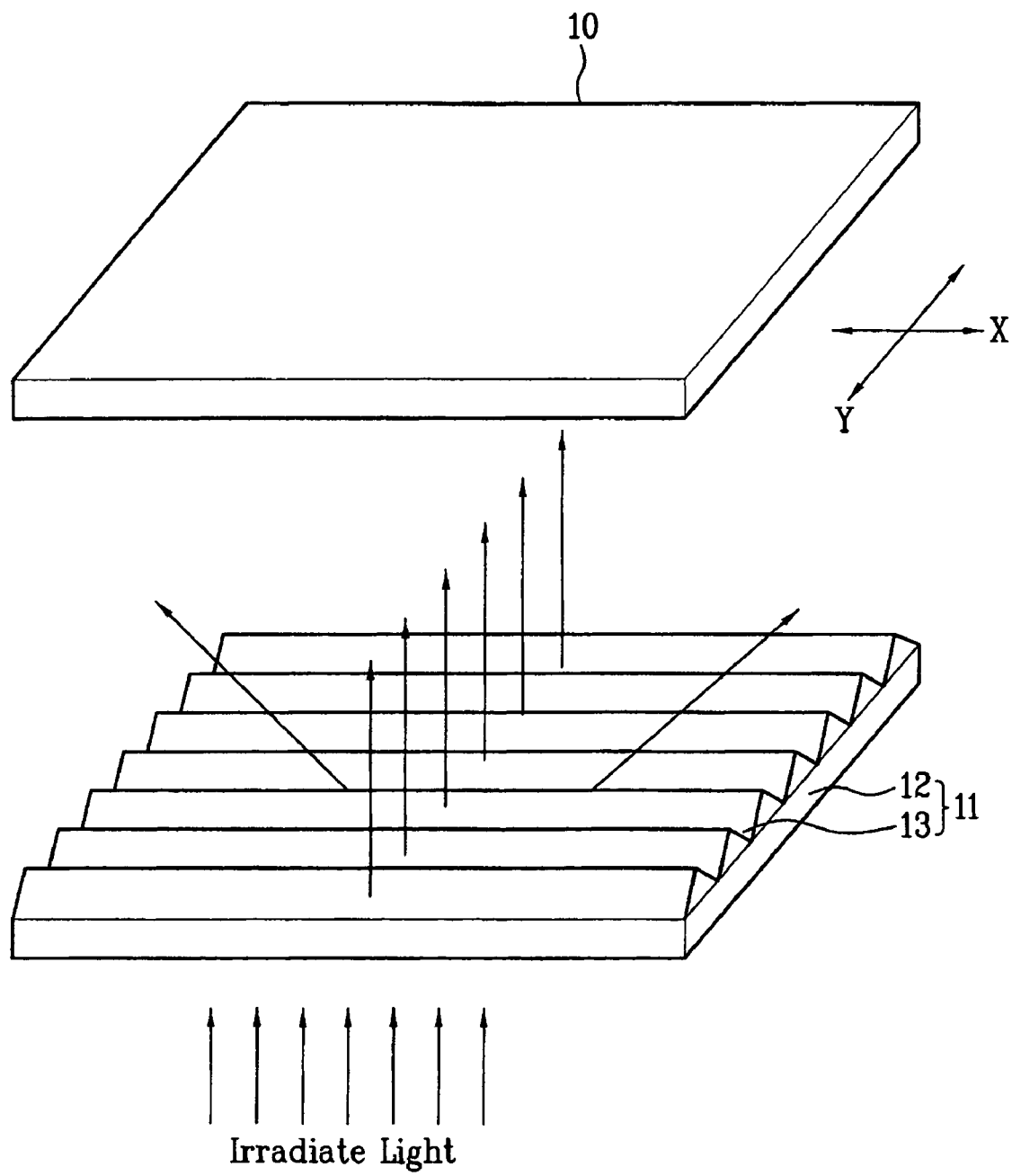
FIG. 1 illustrates a prism and diffusion sheets for a backlight unit of an LCD device according to the related art.
Figure 2:
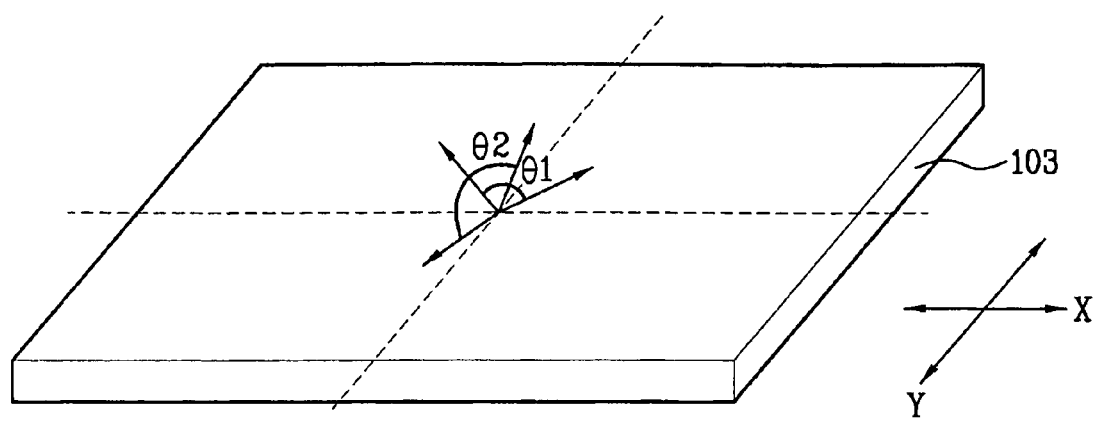
FIG. 2 illustrates viewing angle characteristics depending on condensing efficiency in the backlight unit of FIG. 1.

Light emitted from the related art prism sheet 11 of FIG. 1 is much more diffused in the X-axis direction but less diffused in the Y-direction. To avoid such deviation, the diffusion sheet 300 reduces transmittance of light diffused in the X-axis direction and increases transmittance of light diffused in the Y-axis direction.

Figure 4:
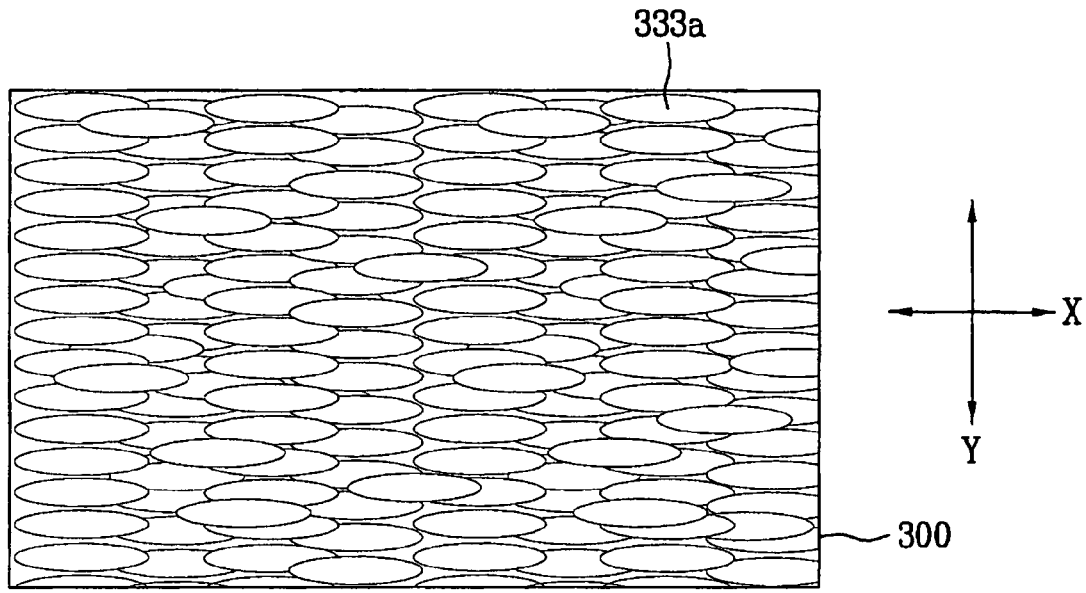
FIG. 4 illustrates a lower surface of the diffusion sheet of FIG. 3.
Figure 5:
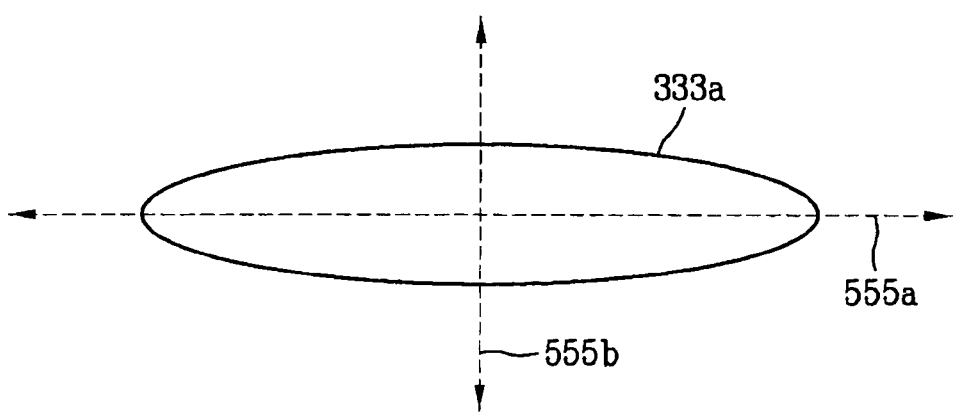
FIG. 5 illustrates one diffusion pattern of the diffusion sheet in FIG. 4.

The structure of the diffusion sheet 300 will now be described with reference to FIGS. 4 and 5. FIG. 4 is a rear view illustrating a rear surface of the diffusion sheet of FIG. 3, and FIG. 5 illustrates any one diffusion pattern of FIG. 4.

As shown in FIG. 4, the rear surface of the diffusion sheet is provided with a plurality of diffusion patterns 333a. As shown in FIG. 5, each of the diffusion patterns 333a has an elliptical shape having a longitudinal axis 555a and a short axis 555b. Each of the diffusion patterns 333a is arranged so that the longitudinal axis 555a is oriented toward the X-axis direction and the short axis 555b is oriented toward the Y-axis direction. This structure of the diffusion sheet more efficiently condenses the light which has passed through the diffusion sheets 300 in the X-axis direction to less efficiently diffuse the light in the X-axis direction but not condense the light well in the Y-axis direction to more efficiently diffuse the light in the Y-axis direction. If the light is actually irradiated toward the diffusion sheet 300 having such a structure, the light will be diffused in a shape as will now be described as follows.

Figure 6:
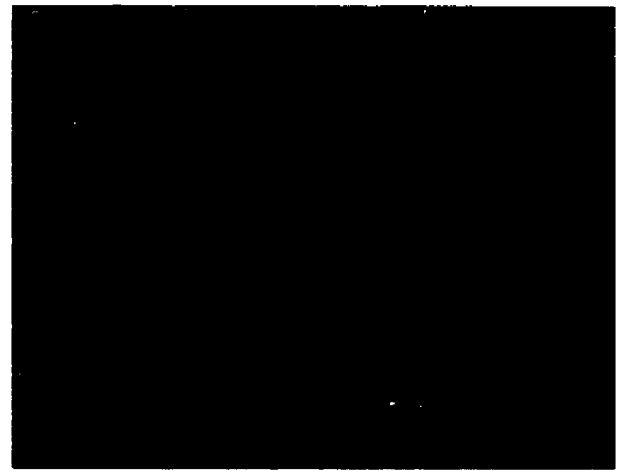
FIG. 6 illustrates an exemplary photograph of a diffusion sheet according to the present invention.
Figure 7:
FIG. 7 illustrates a diffusion range of light passing through the diffusion sheet of FIG. 6 when light is irradiated toward the diffusion sheet.

FIG. 6 illustrates a photograph of a diffusion sheet according to the present invention. As shown in FIG. 6, the diffusion sheet 300 is provided with a plurality of diffusion patterns 333a having an elliptical shape. FIG. 7 illustrates a diffusion range of the light passing through the diffusion sheet when the light is irradiated toward the diffusion sheet. As shown in FIG. 7, the light is not well diffused in the X-axis direction but is well diffused in the Y-axis direction. Here, the light which has passed through the diffusion sheet 300 is well condensed in the X-axis direction and, thus, is not well diffused in the X-axis direction. However, the light is not well condensed in the Y-axis direction and, thus, is well diffused in the Y-axis direction.

Figure 8A:
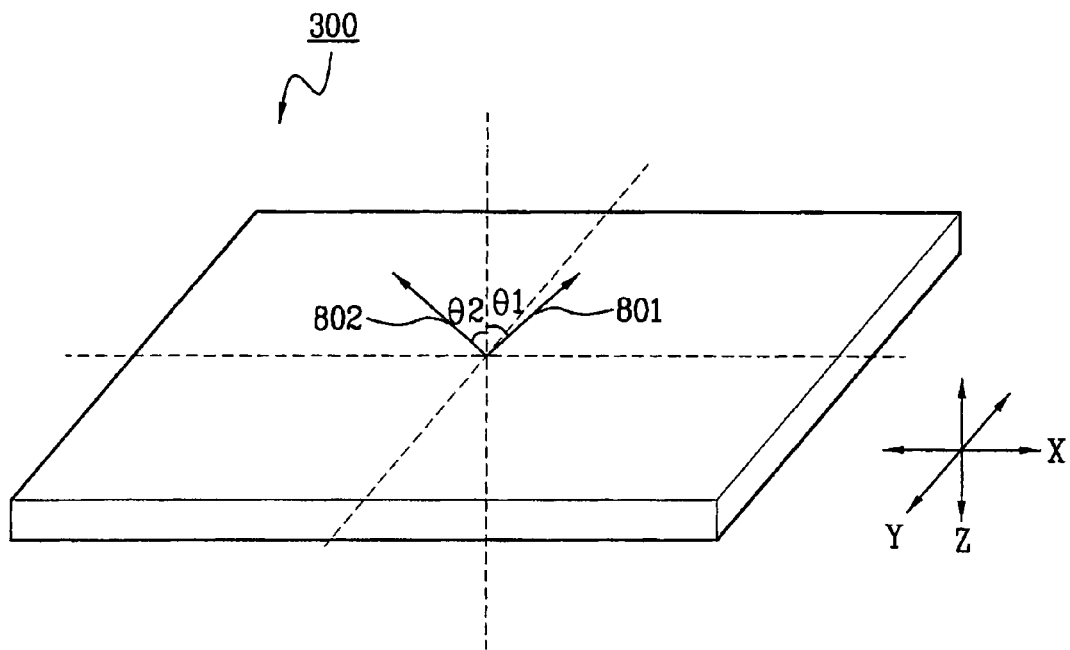
FIGS. 8A and 8B illustrate an experiment that identifies a diffusion range of light through the diffusion sheet.
Figure 8B:
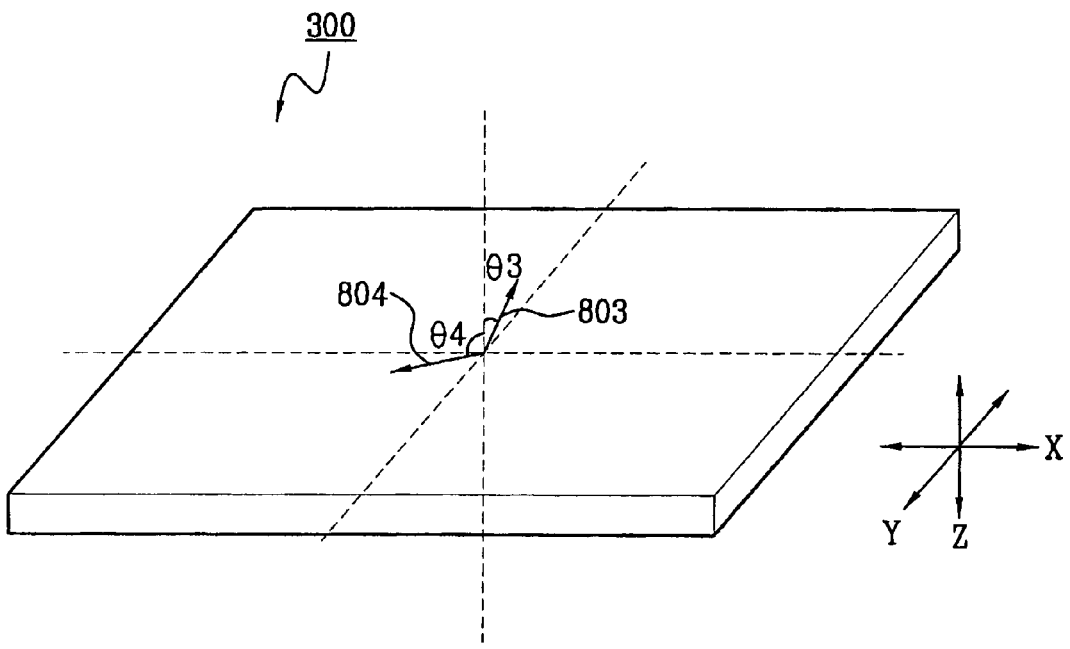

The diffusion range of the diffusion sheet 300 will now be described with reference to FIGS. 8A, 8B, and 9. FIGS. 8A and 8B illustrate an experiment that identifies the diffusion range of the light passing through the diffusion sheet, and FIG. 9 is a graph illustrating the experiment results of FIGS. 8A and 8B.

As shown in FIGS. 8A and 8B, if the light is irradiated toward the center of the diffusion sheet 300 in the Z-axis direction, the light is diffused in both the X-axis direction and the Y-axis direction while passing through the diffusion sheet 300. As shown in FIG. 8A and FIG. 9, the light diffused in a positive direction of the X-axis has decreased transmittance as an angle formed by an axis 801 of the light diffused in the positive X-axis direction and the Z-axis increases. That is, transmittance of the light diffused in the positive X-axis direction is decreased as a value of θ1 increases. Further, the light diffused in a negative direction of the X-axis has decreased transmittance as an angle formed by an axis 802 of the light diffused in the negative X-axis direction and the Z-axis increases. That is, transmittance of the light diffused in the negative X-axis direction is decreased as a value of θ2 increases. Thus, most of the light diffused in the X-axis direction excluding the light which reaches the center of the diffusion sheet 300 fails to pass through the diffusion sheet 300. In other words, the light is little diffused in the X-axis direction.

Figure 9:
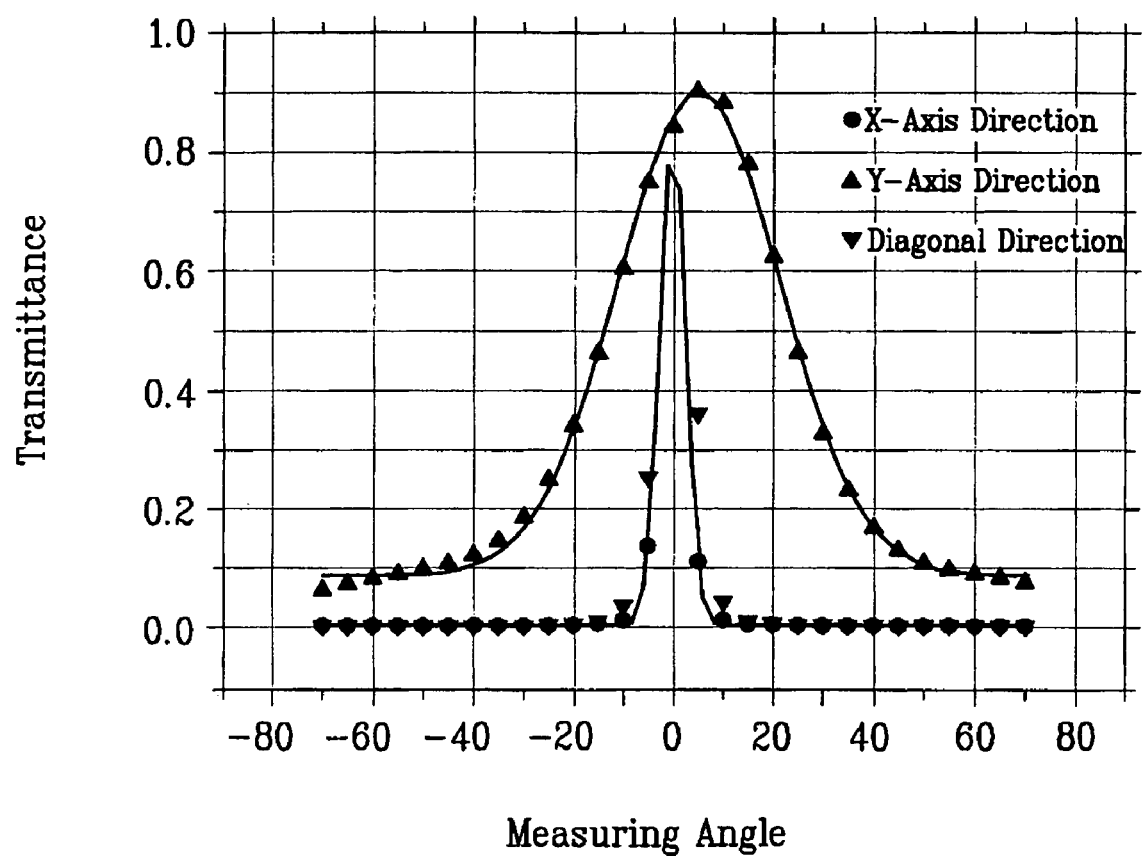
FIG. 9 is a graph illustrating the experimental results of FIGS. 8A and 8B.

As shown in FIG. 8B and FIG. 9, the light diffused in a positive direction of the Y-axis has decreased transmittance as an angle formed by an axis 803 of the light diffused in the positive Y-axis direction and the Z-axis increases. That is, transmittance of the light diffused in the positive Y-axis direction is decreased as a value of θ3 increases. Further, the light diffused in a negative direction of the Y-axis has decreased transmittance as an angle formed by an axis 804 of the light diffused in the negative Y-axis direction and the Z-axis increases. That is, transmittance of the light diffused in the negative Y-axis direction is decreased as the value of θ3 increases. In other words, transmittance of the light diffused in the Y-axis direction shows similar distribution to transmittance of the light diffused in the X-axis direction.

However, as shown in FIG. 9, transmittance of the light diffused in the Y-axis direction is greater than transmittance of the light diffused in the X-axis direction in all directions. Thus, transmittance of the light diffused in the Y-axis direction is greater than transmittance of the light diffused in the X-axis direction. As a result, the diffusion range of the light diffused in the Y-axis direction is greater than the diffusion range of the light diffused in the X-axis direction. Further, the diffusion sheet 300 diffuses the light in the Y-axis direction more efficiently than in the X-axis direction. Meanwhile, transmittance of the light diffused in a diagonal direction diagonally dividing the area of the diffusion sheet 300 is almost identical to transmittance of the light diffused in the X-axis direction.

Accordingly, the light from the prism sheet (similar to the prism sheet 11 of FIG. 1), i.e., the light that is much more diffused in the X-axis direction and less diffused in the Y-axis direction, is less diffused in the X-axis direction and much more diffused in the Y-axis direction while passing through the diffusion sheet 300. The light from the prism sheet 11 is corrected while passing through the diffusion sheet 300 so that the diffusion range of the light in the X-axis direction is almost the same as that of the light in the Y-axis direction. Here, the diffusion sheet 300 sheet may be formed of any one of polycarbonate, acryl, and polyethylene terephthalate resin (PET). Each of the diffusion patterns 333a is formed of any one of the above materials.

Figure 10:
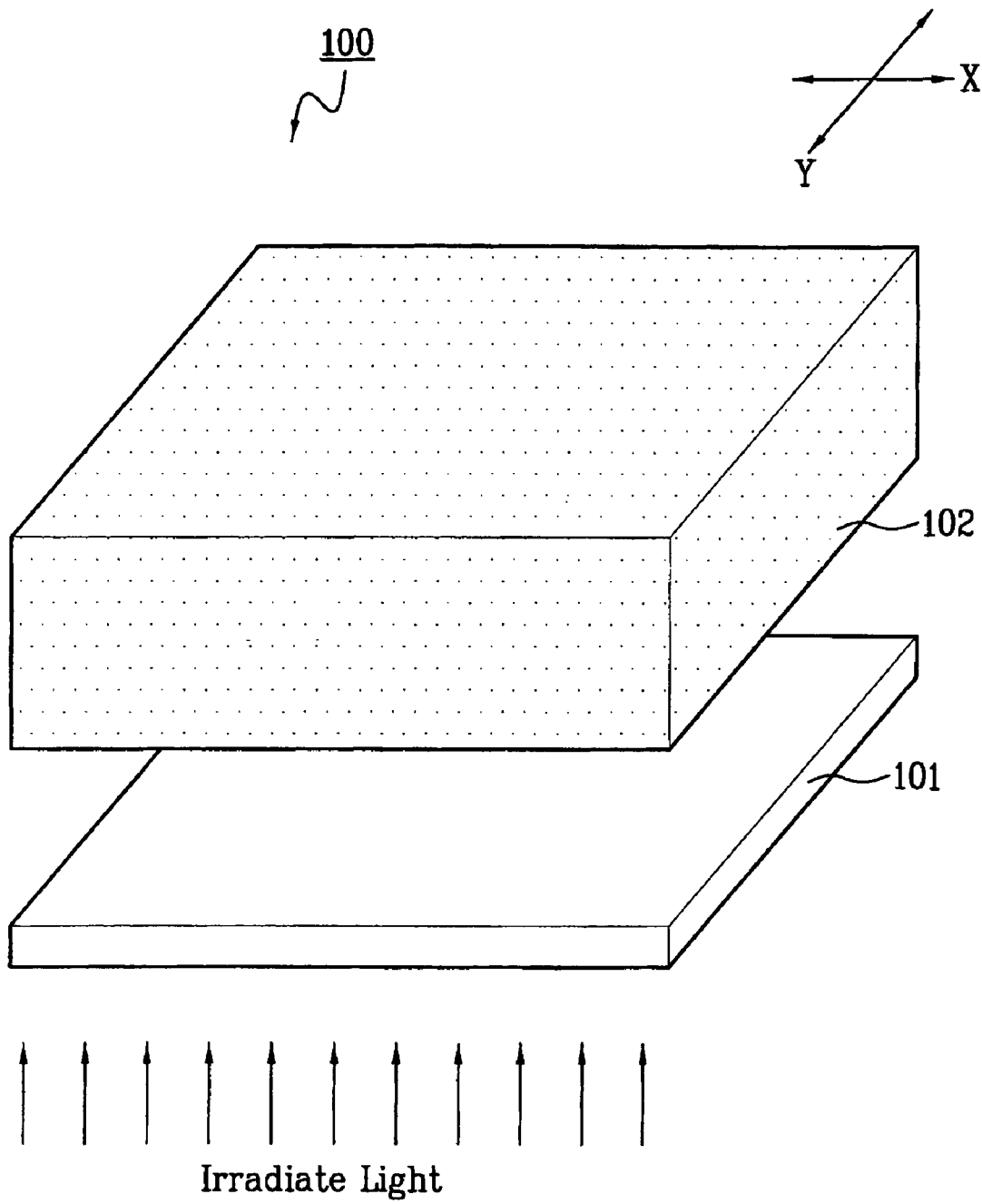
FIG. 10 illustrates a polarizing film according to a first exemplary embodiment of the present invention.

Next, a polarizing film according to a first exemplary embodiment of the present invention will be described in detail with reference to FIG. 10. FIG. 10 illustrates the polarizing film according to the first exemplary embodiment of the present invention.

As shown in FIG. 10, the polarizing film 100 according to the first exemplary embodiment of the present invention includes a diffusion sheet 101 diffusing incident light, and a brightness enhancement sheet 102 arranged above the diffusion sheet 101 to enhance brightness of the light diffused from the diffusion sheet 101. In this case, a plurality of diffusion patterns (not shown) are formed on a rear surface of the diffusion sheet 101 as described above. Since the diffusion sheet 101 has the same structure and function as those of the aforementioned diffusion sheet 300, its description will be replaced with the diffusion sheet 300.

Meanwhile, the light is divided into vertically polarized light (P polarized light) and horizontally polarized light (S polarized light). The brightness enhancement sheet 102 passes through any one of the vertically polarized light and the horizontally polarized light but reflects the other one. A linear reflective type polarizing material, for example, brightness enhancement film (BEF) or dual brightness enhancement film (DBEF) may be used as the brightness enhancement sheet 102.

Supposing that the brightness enhancement sheet 102 passes through every vertically polarized light and reflects almost the horizontally polarized light, the reflected horizontally polarized light is again divided into vertically polarized light and horizontally polarized light. The divided vertically polarized light passes through the brightness enhancement sheet 102 while the divided horizontally polarized light is reflected again. The reflected horizontally polarized light is again divided into vertically polarized light and horizontally polarized light. In this way, the brightness enhancement sheet 102 enhances brightness of the light. In the aforementioned polarizing film 100 according to the first exemplary embodiment of the present invention, the light irradiated onto the rear surface of the diffusion sheet 101 passes through the diffusion sheet 101 and the brightness enhancement sheet 102 in due order, whereby a viewing angle is corrected and brightness is enhanced.

Figure 11:
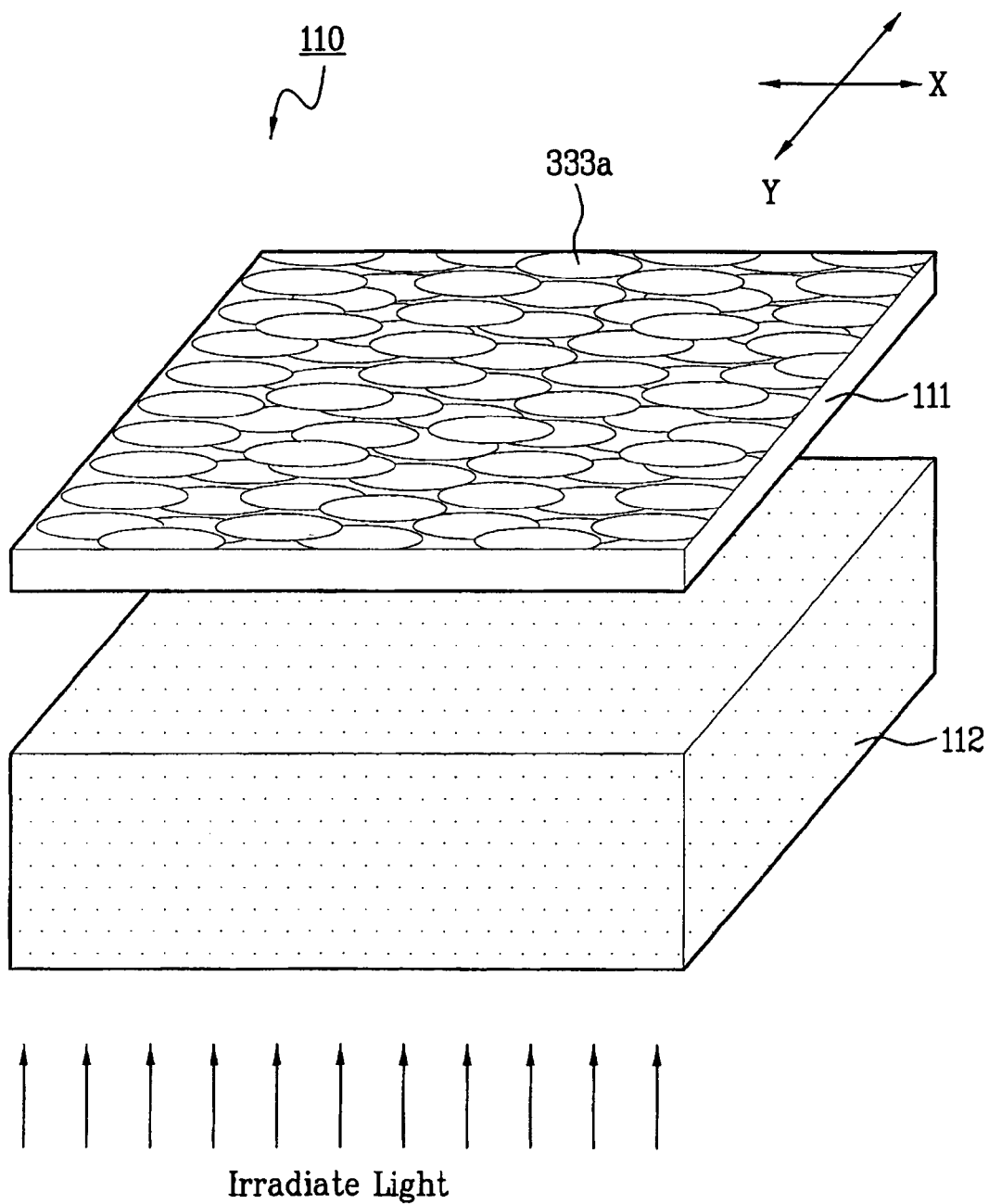
FIG. 11 illustrates a polarizing film according to a second exemplary embodiment of the present invention.

Subsequently, a polarizing film according to a second exemplary embodiment of the present invention will be described in detail with reference to FIG. 11. FIG. 11 illustrates the polarizing film according to the second exemplary embodiment of the present invention.

As shown in FIG. 11, the polarizing film 110 according to the second embodiment of the present invention includes a diffusion sheet 111 diffusing incident light, and a brightness enhancement sheet 112 arranged below the diffusion sheet 111 to enhance brightness of external light. In this case, a plurality of diffusion patterns 333a are formed on an upper surface of the diffusion sheet 111 as described above. Since the diffusion sheet 111 has the same structure and function as those of the aforementioned diffusion sheet 300, its description will be replaced with the diffusion sheet 300. In the aforementioned polarizing film 110 according to the second exemplary embodiment of the present invention, the light irradiated onto the rear surface of the brightness enhancement sheet 112 passes through the brightness enhancement sheet 112 and the diffusion sheet 111 in due order. Thus, a viewing angle is corrected, and brightness is enhanced.

Figure 12:
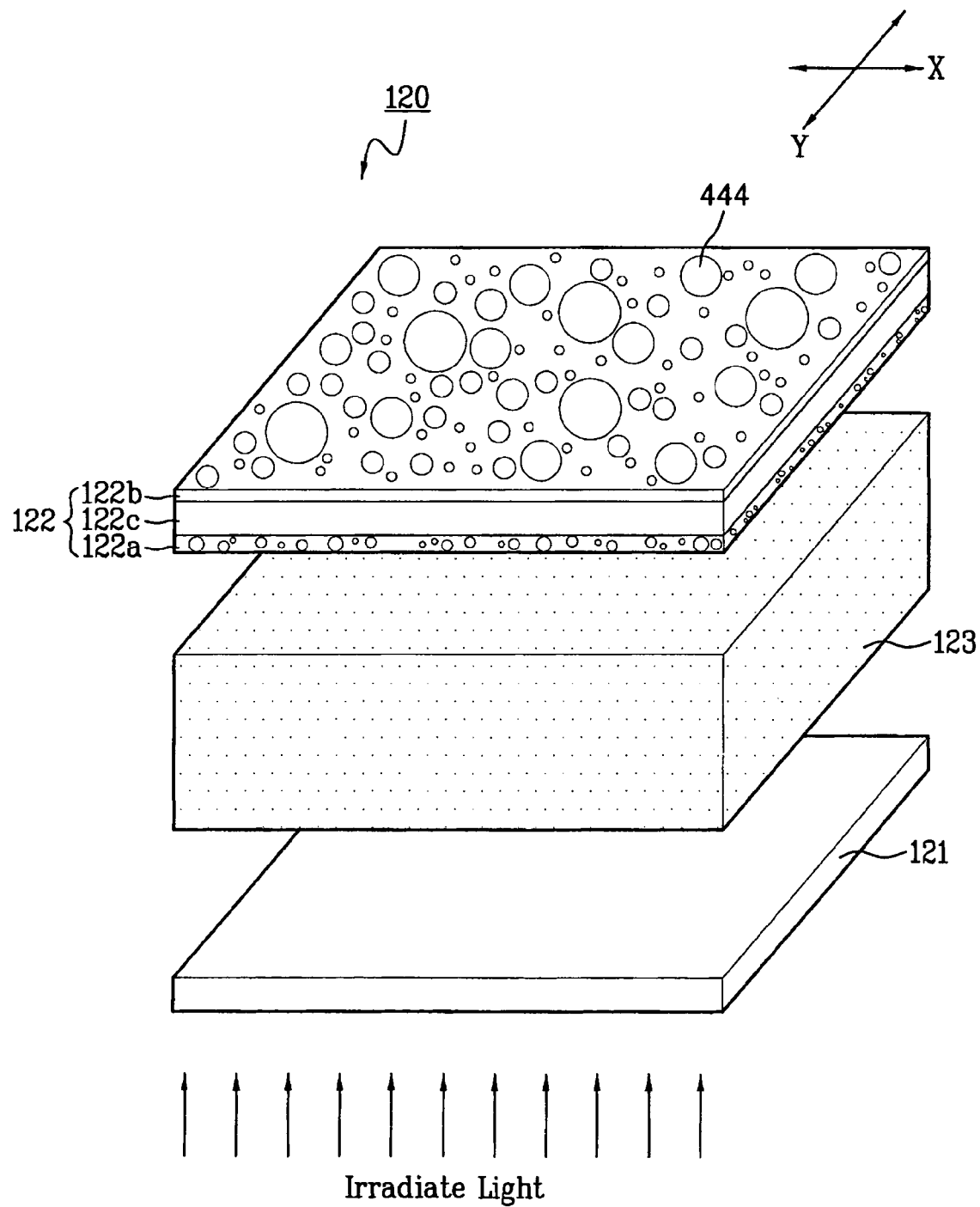
FIG. 12 illustrates a polarizing film according to a third exemplary embodiment of the present invention.

Next, a polarizing film according to a third exemplary embodiment of the present invention will be described with reference to FIG. 12. FIG. 12 illustrates the polarizing film according to the third exemplary embodiment of the present invention.

As shown in FIG. 12, the polarizing film 120 according to the third exemplary embodiment of the present invention includes a first diffusion sheet 121 diffusing incident light, a second diffusion sheet 122 arranged above the first diffusion sheet 121 opposing the first diffusion sheet 121, and a brightness enhancement sheet 123 arranged between the first diffusion sheet 121 and the second diffusion sheet 122 to enhance brightness of the light diffused from the first diffusion sheet 121 and emit the light of the enhanced brightness to the second diffusion sheet 122. In this case, a plurality of diffusion patterns (not shown) are formed on a lower surface of the first diffusion sheet 121. Since the first diffusion sheet 121 has the same structure and function as those of the aforementioned diffusion sheet 300, its description will be replaced with the diffusion sheet 300.

Meanwhile, the second diffusion sheet 122 includes first and second bead layers 122a and 122b provided with beads 444, and a diffusion layer 122c formed between the first and second bead layers 122a and 122b. The second diffusion sheet 122 uniformly diffuses the incident light using the beads 444 and the diffusion layer 122c. In other words, the second diffusion sheet 122 uniformly diffuses the light in the X-axis direction and the Y-axis direction.

Figure 13:
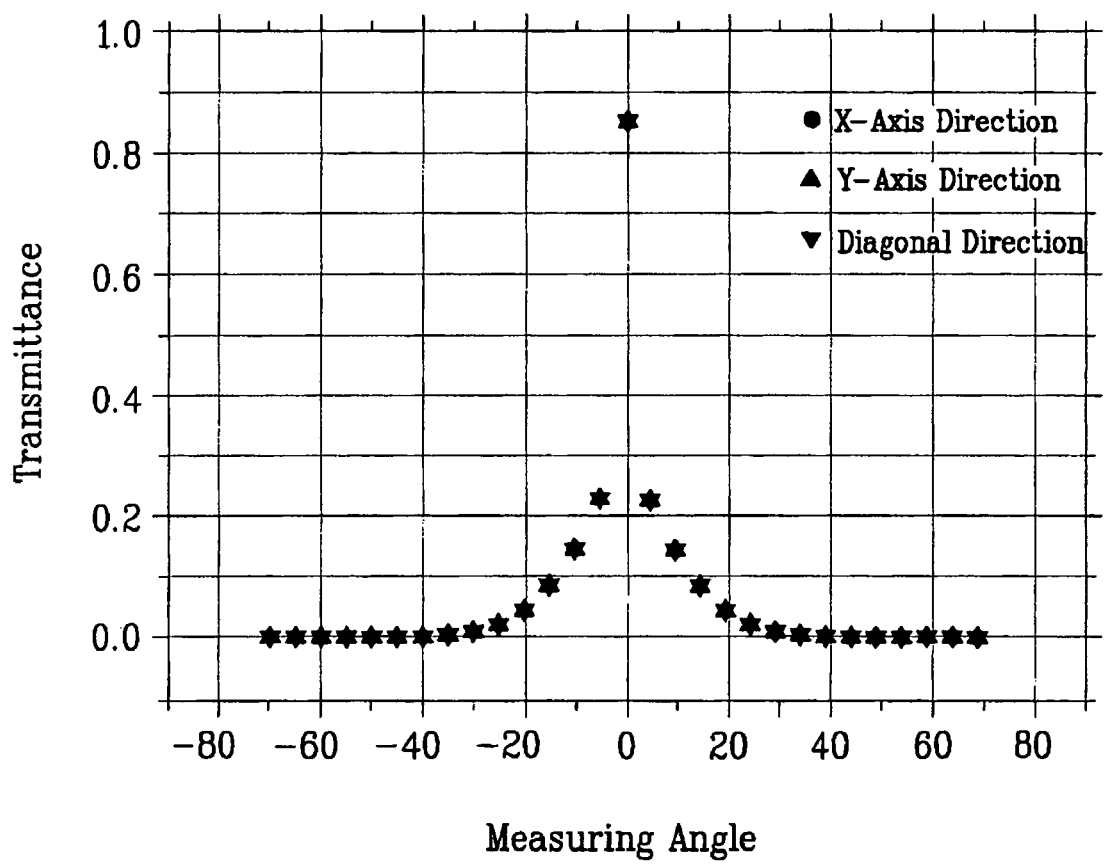
FIG. 13 is a graph illustrating transmittance of light passing through a second diffusion sheet of FIG. 12.

The diffusion range of the light will now be described with reference to transmittance of the light passing through the second diffusion sheet 122 of FIG. 12. FIG. 13 is a graph illustrating transmittance of the light passing through the second diffusion sheet 122 of FIG. 12.

The transmittance of the light passing through the second diffusion sheet 122 is obtained in the same manner as the method of experimental transmittance of the light from the diffusion sheet 300 of FIGS. 8A and 8B. Thus, the transmittance will be described with reference to FIGS. 8A and 8B.

First, as shown in FIGS. 8A and 8B, if the light is irradiated toward the center of the second diffusion sheet 122 in the Z-axis direction, the light is diffused in the X-axis direction and the Y-axis direction while passing through the second diffusion sheet 122. At this time, as shown in FIG. 8A and FIG. 13, the light diffused in the positive X-axis direction has decreased transmittance as the angle formed by the axis 801 of the light diffused in the positive X-axis direction and the Z-axis increases. In other words, transmittance of the light diffused in the positive X-axis direction is decreased as the value of θ1 increases. Further, the light diffused in the negative X-axis direction has decreased transmittance as the angle formed by the axis 802 of the light diffused in the negative X-axis direction and the Z-axis increases. In other words, transmittance of the light diffused in the negative X-axis direction is decreased as the value of θ2 increases.

Meanwhile, as shown in FIG. 8B and FIG. 13, the light diffused in the Y-axis direction has a transmittance that decreases as the angle formed by an axis 803 of the fused in the positive Y-axis direction and the Z-axis increases. In other words, transmittance of the light diffused in the positive Y-axis direction is decreased as the value of θ3 increases.

Further, the light diffused in the negative direction of the Y-axis has decreased transmittance as the angle formed by the axis 804 of the light diffused in the negative Y-axis direction and the Z-axis increases. In other words, transmittance of the light diffused in the negative Y-axis direction is decreased as the value of θ3 increases.

Therefore, as shown in FIG. 13, the transmittance of the light diffused in the Y-axis shows a similar distribution to the transmittance of the light diffused in the X-axis direction. That is, the transmittance of the light diffused in the Y-axis direction is almost identical to transmittance of the light in the X-axis direction. Also, transmittance of the light diffused in the diagonal direction is almost identical to transmittance of the light diffused in the X-axis direction. As a result, the second diffusion sheet 122 uniformly diffuses the light in all directions.

In the aforementioned polarizing film 120 according to the third exemplary embodiment of the present invention, the light irradiated onto the rear surface of the first diffusion sheet 121 is corrected through the first diffusion sheet 121 to compensate deviation of the viewing angle, the brightness of the corrected light is enhanced through the brightness enhancement sheet 123, and the light having the enhanced brightness is uniformly diffused through the second diffusion sheet 122. Meanwhile, the first and second diffusion sheets 121 and 122 may be exchanged with each other in their position by interposing the brightness enhancement sheet 123 therebetween.

Figure 14:
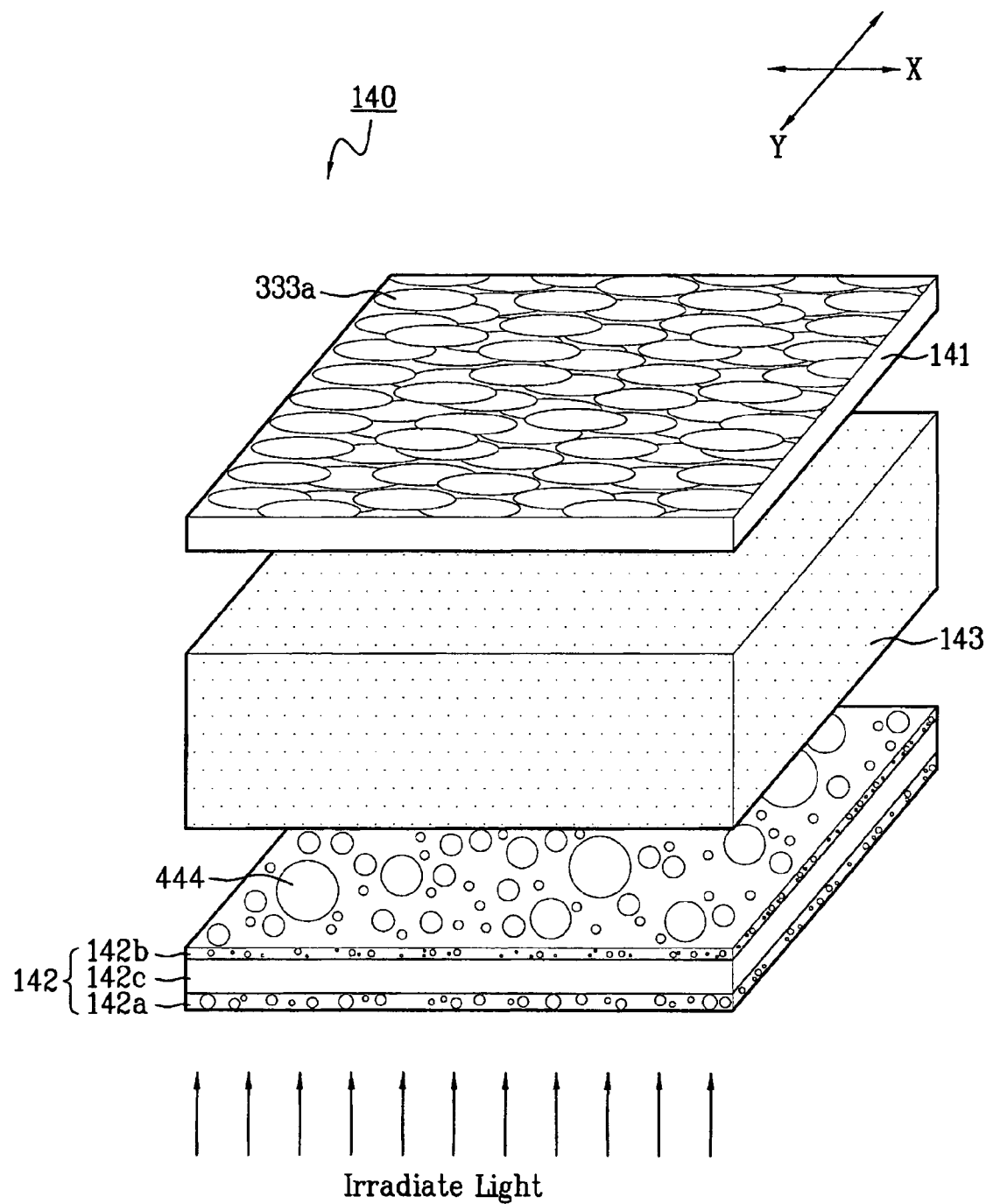
FIG. 14 illustrates a polarizing film according to a fourth exemplary embodiment of the present invention.

FIG. 14 illustrates a polarizing film according to a fourth exemplary embodiment of the present invention.

As shown in FIG. 14, the polarizing film 140 according to the fourth embodiment of the present invention includes a first diffusion sheet 141 diffusing incident light, a second diffusion sheet 142 arranged below the first diffusion sheet 141 opposing the first diffusion sheet 141, and a brightness enhancement sheet 143 arranged between the first diffusion sheet 141 and the second diffusion sheet 142.

In the aforementioned polarizing film 140 according to the fourth exemplary embodiment of the present invention, the light irradiated onto the lower surface of the second diffusion sheet 142 is uniformly diffused through the second diffusion sheet 142, the brightness of the diffused light is enhanced through the brightness enhancement sheet 143, and the light having the enhanced brightness is corrected through the first diffusion sheet 141 to compensate deviation of the viewing angle.

Figure 15:
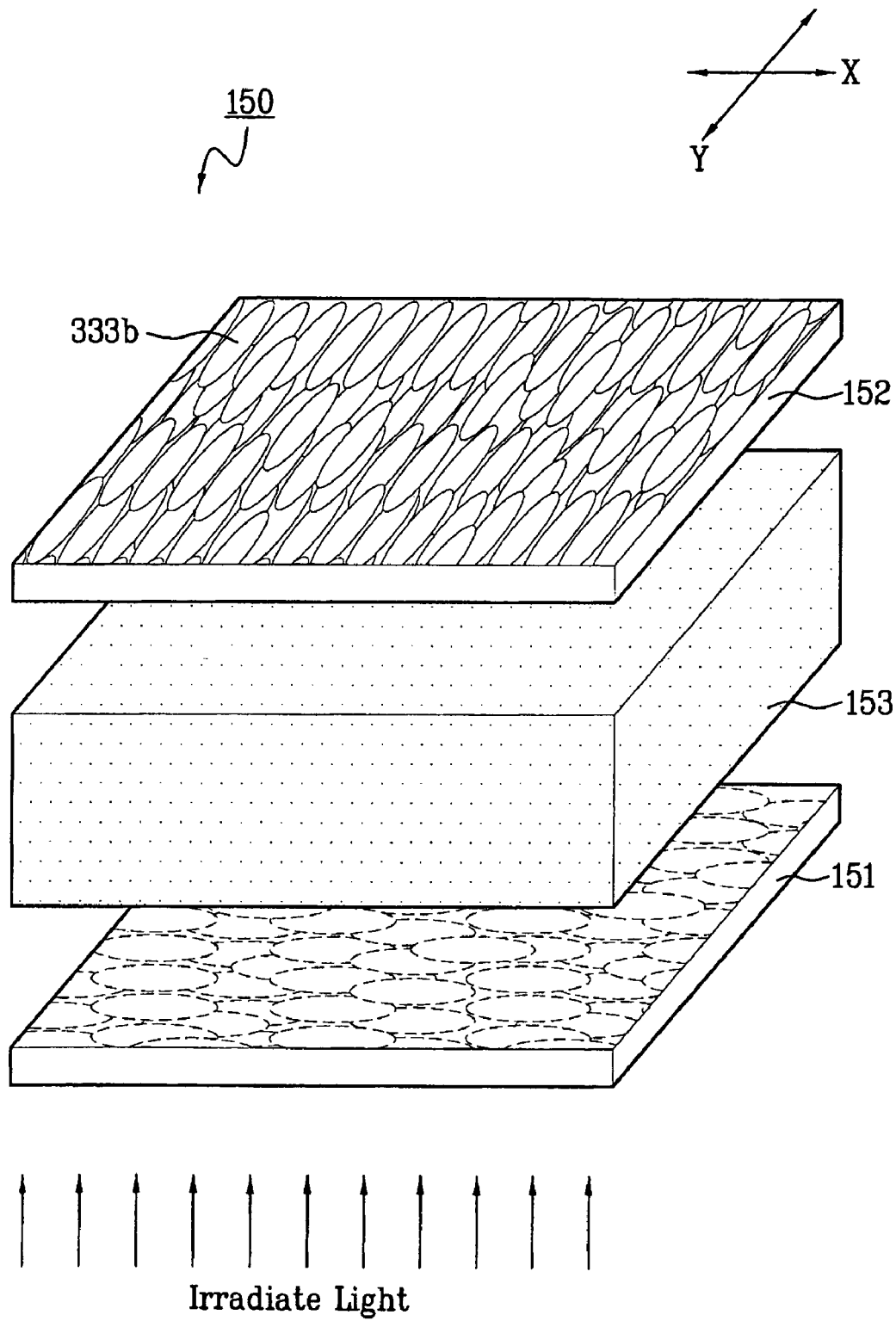
FIG. 15 illustrates a polarizing film according to a fifth exemplary embodiment of the present invention.
Figure 16A:
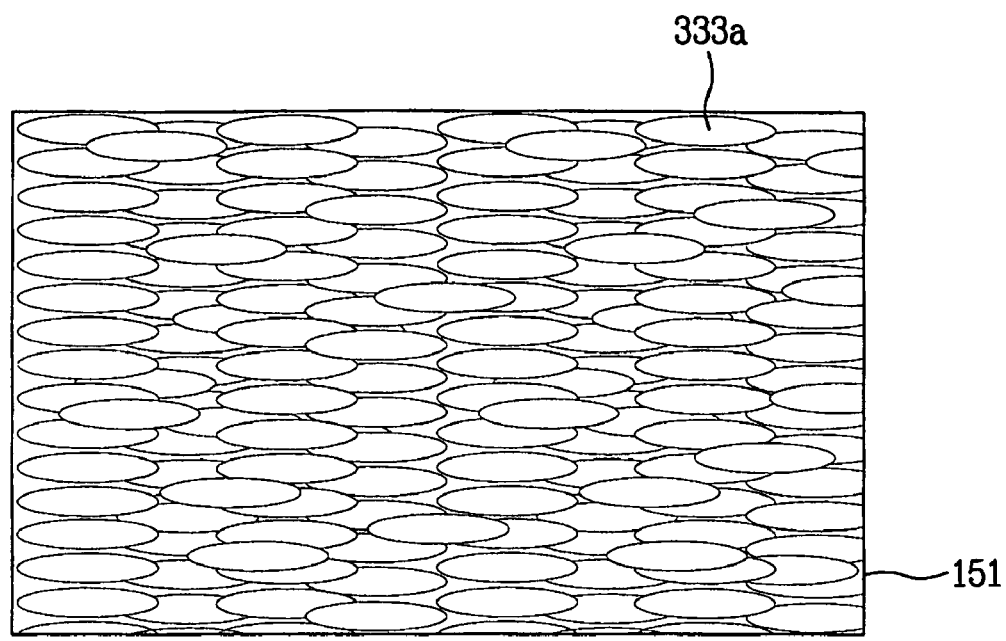
FIGS. 16A and 16B illustrate a lower surface of a first diffusion sheet and an upper surface of a second diffusion sheet of FIG. 15.
Figure 16B:
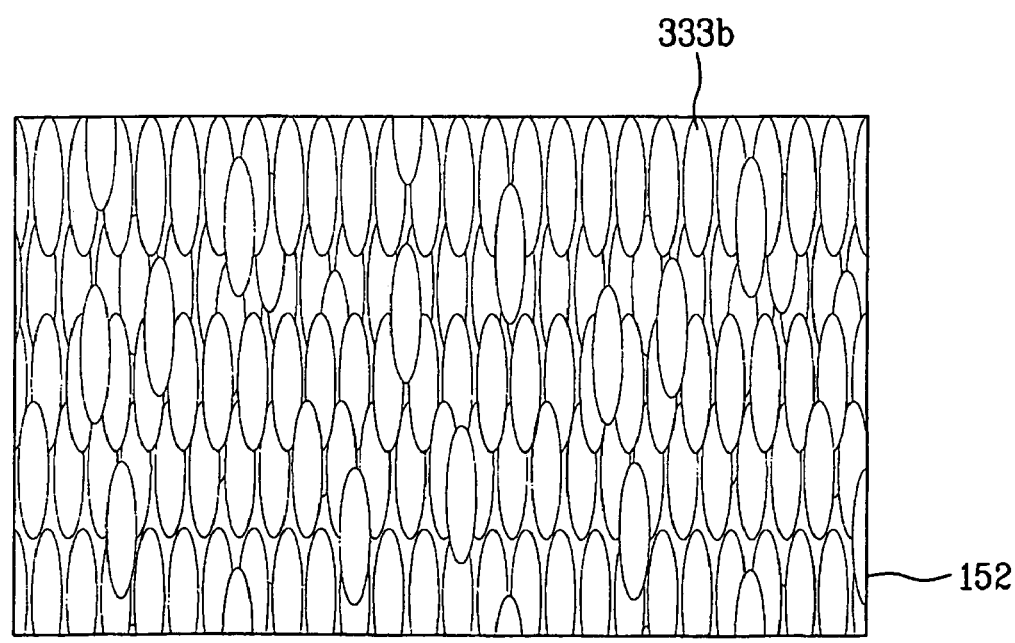

Next, a polarizing film according to a fifth exemplary embodiment of the present invention will be described in detail. FIG. 15 illustrates the polarizing film according to the fifth exemplary embodiment of the present invention, and FIGS. 16A and 16B illustrate correction states of a lower surface of a first diffusion sheet and an upper surface of a second diffusion sheet shown in FIG. 15.

As shown in FIG. 15, the polarizing film 150 according to the fifth exemplary embodiment of the present invention includes a first diffusion sheet 151, a second diffusion sheet 152 arranged above the first diffusion sheet 151 opposing the first diffusion sheet 151, and a brightness enhancement sheet 153 arranged between the first diffusion sheet 151 and the second diffusion sheet 152.

In this case, the first and second diffusion sheets 151 and 152 have the same structure and function as those of the aforementioned diffusion sheet 300. That is, a plurality of first diffusion patterns 333a are formed on a rear surface of the first diffusion sheet 141 as shown in FIG. 16A while a plurality of second diffusion patterns 333b are formed on an upper surface of the second diffusion sheet 152 as shown in FIG. 16B. Each of the first diffusion patterns 333a has a longitudinal axis 555a oriented in the X-axis direction while each of the second diffusion patterns 333b has a longitudinal axis 555a arranged in the Y-axis direction. Accordingly, the longitudinal axis 555a of the first diffusion pattern 333a crosses the longitudinal axis 555a of the second diffusion pattern 333b.

In the aforementioned structure, the first diffusion sheet 151 more efficiently diffuses the light diffused in the Y-axis direction while the second diffusion sheet 152 more efficiently diffuses the light diffused in the X-axis direction. In other words, the first diffusion sheet 151 and the second diffusion sheet 152 more efficiently diffuse the light diffused in directions opposite to each other. Therefore, the light from the prism sheet (similar to the prism sheet 11 of FIG. 1) is primarily corrected through the first diffusion sheet 151 and secondarily corrected through the second diffusion sheet 152.

Figure 17A:
FIGS. 17A and 17B illustrate correction states of light passing through first and second diffusion sheets.
Figure 17B:

FIGS. 17A and 17B illustrate the correction state of the light passing through first and second diffusion sheets 151 and 152. As shown in FIGS. 17A and 17B, the light diffused in the X-axis direction has a decreased diffusion range while passing through the first diffusion sheet 151 and has an increased diffusion range while passing through the second diffusion sheet 152. Thus, the light diffused in the X-axis direction after passing through the first and second diffusion sheets 151 and 152 in due order has a diffusion size corresponding to a middle size between a diffusion size of the X-axis direction and a diffusion size of the Y-axis direction, as shown in FIG. 17A. Likewise, the light diffused in the Y-axis direction has an increased diffusion range while passing through the first diffusion sheet 151 and has a decreased diffusion range while passing through the second diffusion sheet 152. Thus, the light diffused in the Y-axis direction after passing through the first and second diffusion sheets 151 and 152 in due order has a diffusion size corresponding to a middle size between a diffusion size of the X-axis direction and a diffusion size of the Y-axis direction, as shown in FIG. 17B.

Consequently, the light diffused in the X-axis direction and the light diffused in the Y-axis direction after passing through the first and second diffusion sheets 151 and 152 have the same diffusion size as each other. Thus, the light emitted from the prism sheet is corrected to compensate deviation of the viewing angle. The light from the first diffusion sheet 151 has enhanced brightness through the brightness enhancement sheet 153.

Figure 18:
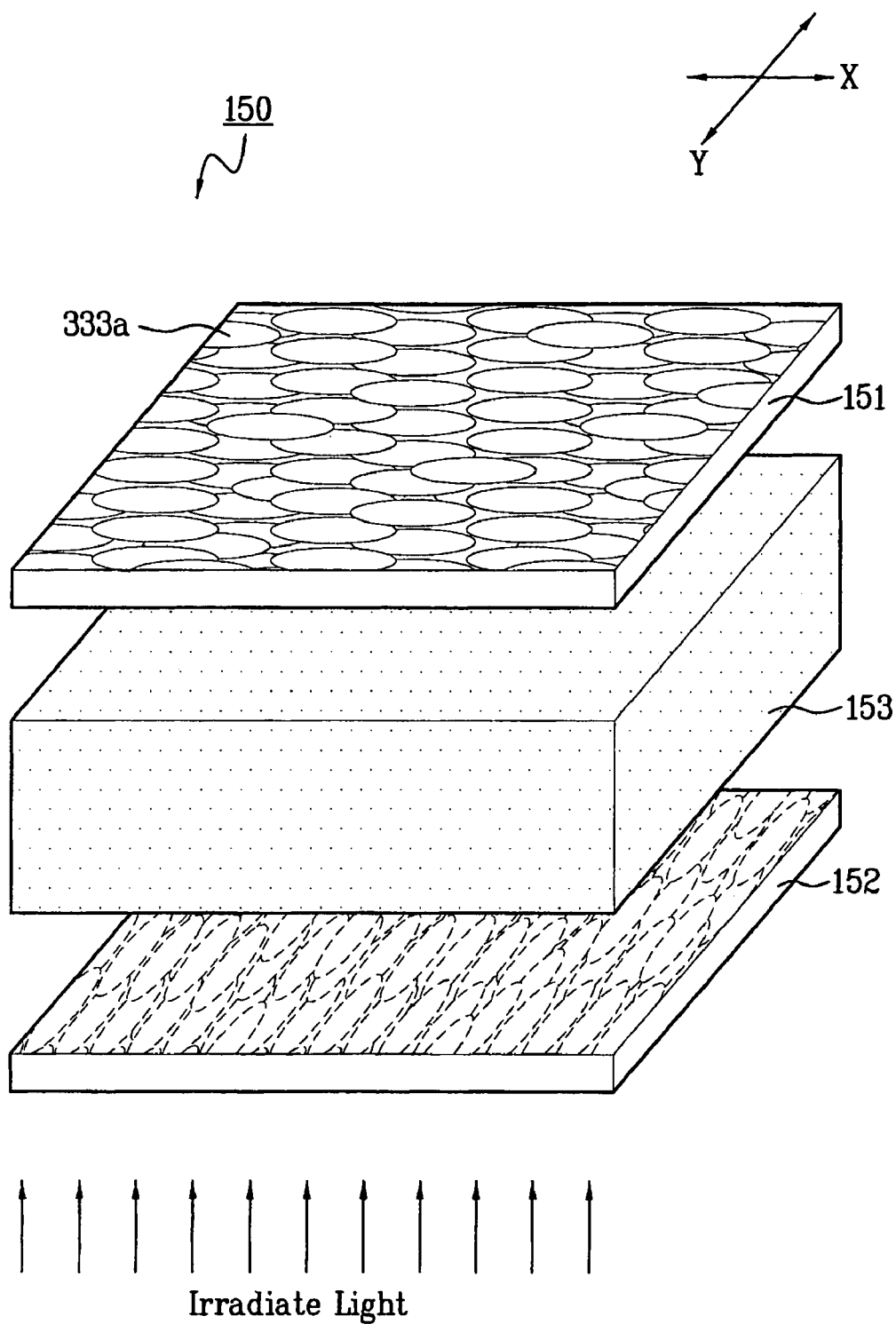
FIG. 18 illustrates a polarizing film according to a sixth exemplary embodiment of the present invention.

FIG. 18 illustrates a polarizing film according to a sixth exemplary embodiment of the present invention. As shown in FIG. 18, the first diffusion sheet 151 and the second diffusion sheet 152 may be exchanged with each other in their position. That is, the first diffusion sheet 151 may be positioned above the second diffusion sheet 152. At this time, a plurality of first diffusion patterns 333a are formed on the upper surface of the first diffusion sheet 151, and a plurality of second diffusion patterns 333b are formed on the lower surface of the second diffusion sheet 152.

In the aforementioned polarizing film according to the sixth exemplary embodiment of the present invention, the light irradiated onto the lower surface of the second diffusion sheet 152 is primarily corrected through the second diffusion sheet 152, the corrected light has enhanced brightness through the brightness enhancement sheet 153, and the light having the enhanced brightness is secondarily corrected through the first diffusion sheet 151.

Figure 19:
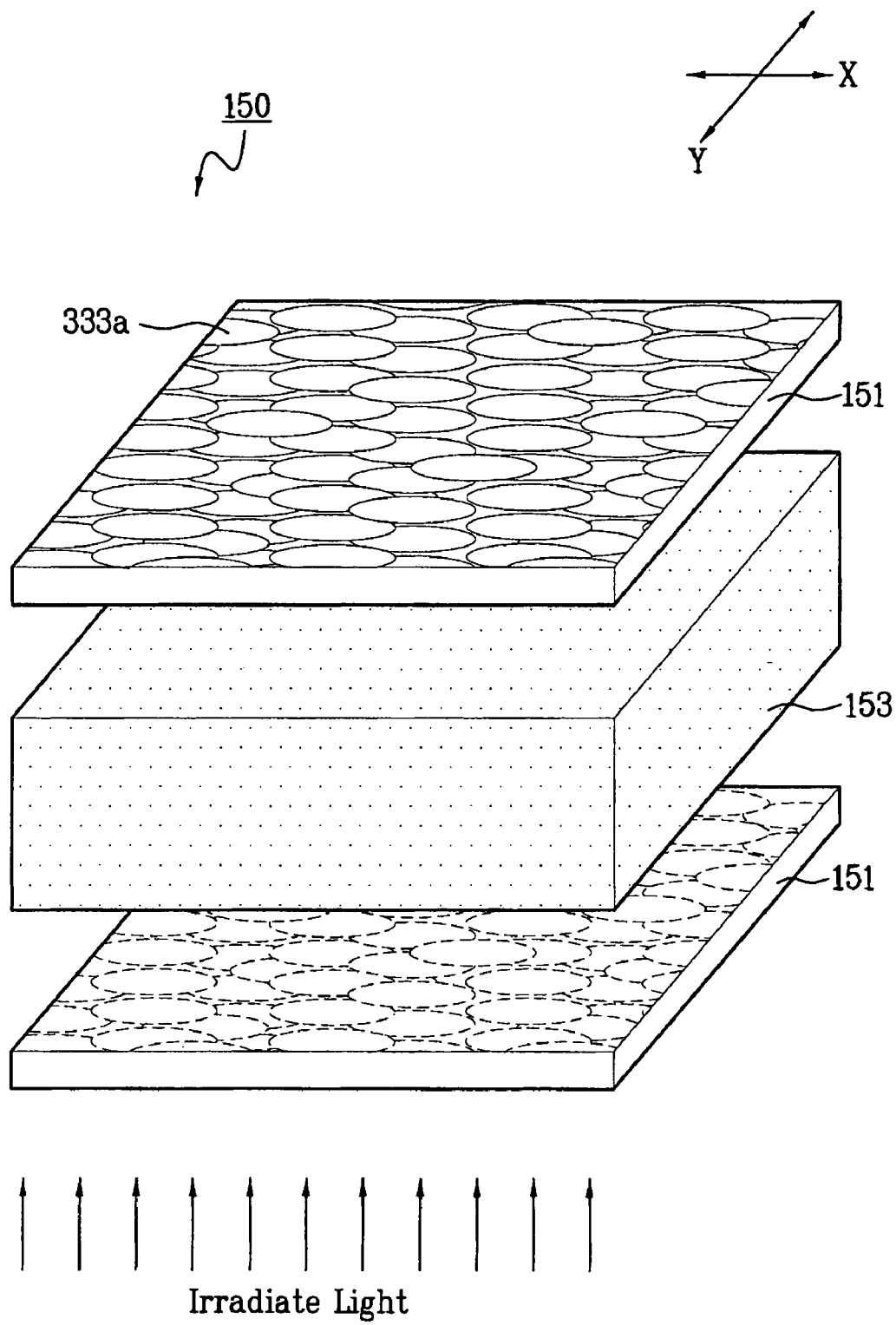
FIG. 19 illustrates a polarizing film according to a seventh exemplary embodiment of present invention.

FIG. 19 illustrates a polarizing film according to a seventh exemplary embodiment of the present invention. As shown in FIG. 19, the first diffusion sheet 151 may respectively be formed above and below the brightness enhancement sheet 153. At this time, a plurality of first diffusion patterns 333a are formed on the upper surface of the first diffusion sheet 151.

In the aforementioned polarizing film according to the seventh exemplary embodiment of the present invention, the light irradiated onto the lower surface of the first diffusion sheet 151 is primarily corrected through the first diffusion sheet 151, the corrected light has enhanced brightness through the brightness enhancement sheet 153, and the light having the enhanced brightness is secondarily corrected through the first diffusion sheet 151.

Figure 20:
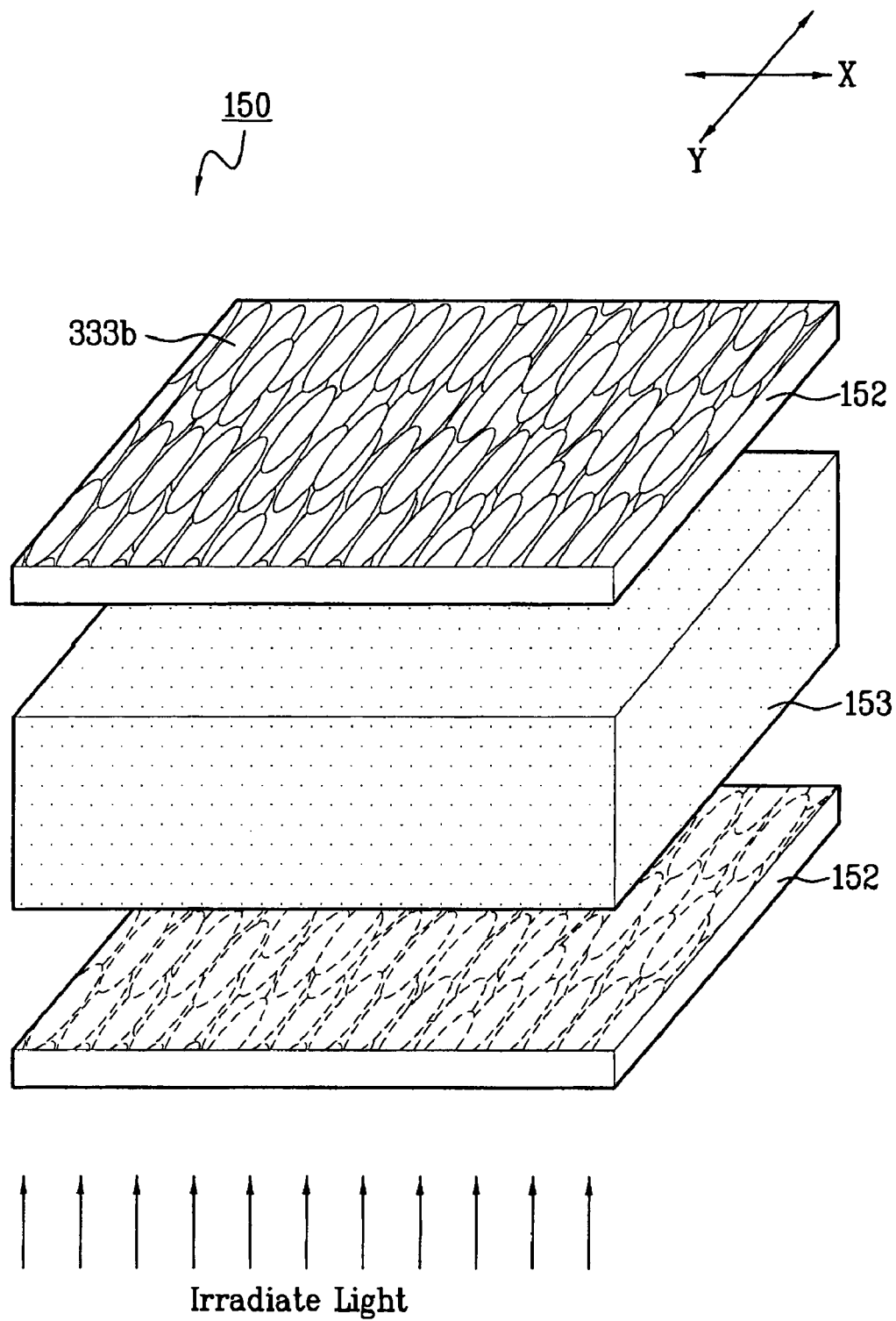
FIG. 20 illustrates a polarizing film according to a eighth exemplary embodiment of present invention.

FIG. 20 illustrates a polarizing film according to a eighth exemplary embodiment of the present invention. As shown in FIG. 20, the second diffusion sheet 152 may respectively be formed above and below the brightness enhancement sheet 153. At this time, a plurality of second diffusion patterns 333b are formed on the rear surface of the second diffusion sheet 152.

In the aforementioned polarizing film according to the eighth exemplary embodiment of the present invention, the light irradiated onto the lower surface of the second diffusion sheet 152 is primarily corrected through the second diffusion sheet 152, the corrected light has enhanced brightness through the brightness enhancement sheet 153, and the light having the enhanced brightness is secondarily corrected through the second diffusion sheet 152.

Figure 21:
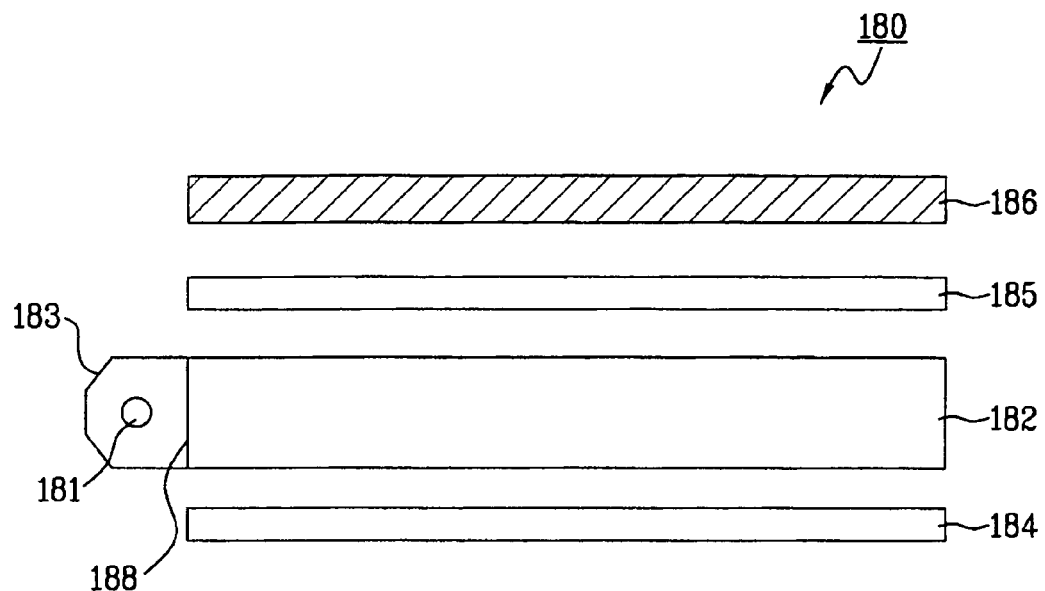
FIG. 21 illustrates a backlight unit according to a first exemplary embodiment of the present invention.

Hereinafter, a backlight unit having the aforementioned diffusion sheet will be described. FIG. 21 illustrates a backlight unit according to a first exemplary embodiment of the present invention.

As shown in FIG. 21, the backlight unit according to the first exemplary embodiment of the present invention includes a lamp 181 emitting light, a light guide plate 182 emitting surface light through an incident surface 188 using the light emitted from the lamp 181, a lamp housing 181 arranged to surround the incident surface 188 of the light guide plate 182 and the lamp 181, condensing the light emitted form the lamp 181 into the incident surface 188 of the light guide plate 182, a reflecting plate 184 arranged below the light guide plate 182, a prism sheet 185 arranged above the light guide plate 182 to condense the light passing through the light guide plate 182, and a diffusion sheet 186 provided with a plurality of diffusion patterns 333a or 333b diffusing the light emitted from the prism sheet 185 in at least two directions to allow the light to have different strengths. A cold cathode fluorescent lamp may be used as the lamp 181. The lamp 181 is lighted by a lamp driving voltage from an inverter (not shown) and emits the light. The lamp housing 181 has a U shape and is provided with a reflecting surface (not shown) therein. The light emitted from the lamp 181 is transmitted to the prism sheet 185 through the reflecting surface.

As described above, the prism sheet 185 includes a condensing layer, and a plurality of prism peaks formed on the condensing layer. Each of the prism peaks has a triangular prism shape and their apexes are arranged on the condensing sheet opposing the diffusion sheet 186. Since the diffusion sheet 186 is the same as the diffusion sheet 300 shown in FIG. 3, its description will be replaced with the aforementioned description of the diffusion sheet 300. Furthermore, the backlight unit 180 according to the first exemplary embodiment of the present invention may include any one of the polarizing films 100, 110, 120, 140 and 150 according to the first to eighth exemplary embodiments instead of the diffusion sheet 186. In such case, the light emitted from the lamp 181 is irradiated onto a rear surface of an LCD panel after passing through the light guide plate 182, the prism sheet 185, and the diffusion sheet 186 (or any one of the polarizing films 100, 110, 120, 140 and 150 according to the first to eighth exemplary embodiments) in due order.

At this time, the light from the prism sheet 185 is corrected through the diffusion sheet 186 (or any one of the polarizing films 100, 110, 120, 140 and 150 according to the first to eighth exemplary embodiments) to compensate deviation of the viewing angle. Therefore, for an image displayed in the LCD panel, the viewing angle in the X-axis direction becomes substantially identical to the viewing angle in the Y-axis direction.

Figure 22:
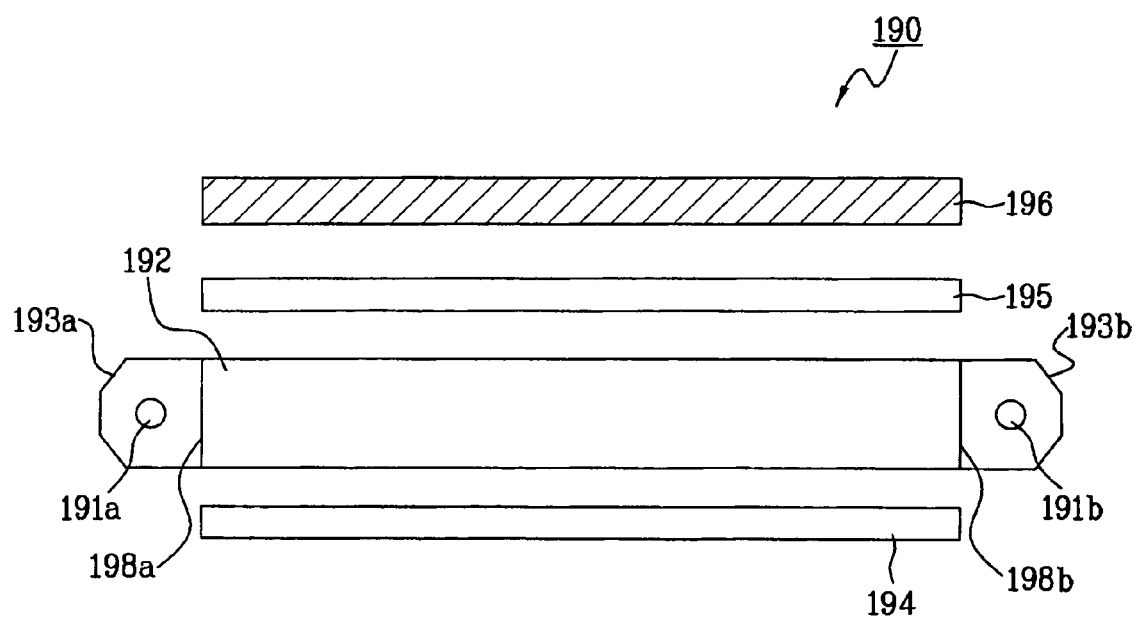
FIG. 22 illustrates a backlight unit according to a second exemplary embodiment of the present invention.

A backlight unit according to a second exemplary embodiment of the present invention will be described. FIG. 22 illustrates the backlight unit according to the second embodiment of the present invention.

As shown in FIG. 22, the backlight unit according to the second exemplary embodiment of the present invention includes a light guide plate 195 emitting surface light through incident surfaces 199a and 199b, a first lamp 191 a arranged at one side of the light guide plate 195, a first lamp housing 193a connected with one side of the light guide plate 195 to surround the incident surface 199a of the light guide plate 195 and the first lamp 191a, a second lamp 191b arranged at the other side of the light guide plate 195, a second lamp housing 193b connected with the other side of the light guide plate 195 to surround the incident surface 199b of the light guide plate 195 and the second lamp 191b, a prism sheet 195 arranged above the light guide plate 195 to condense the light passing through the light guide plate 195, and a diffusion sheet 196 provided with a plurality of diffusion patterns 333a or 333b diffusing the light emitted from the prism sheet 195 in at least two directions to allow the light to have different strengths. Since the first lamp 191*a*, the second lamp 191*b*, the first lamp housing 193*a*, and the second lamp housing 193*b* may be substantially the same as the lamp 181 and the lamp housing 183 according to the first exemplary embodiment, their description will be omitted. Since the diffusion sheet 196 may be substantially the same as the diffusion sheet 300 shown in FIG. 3, its description will be omitted. Furthermore, the backlight unit 190 according to the second exemplary embodiment of the present invention may include any one of the polarizing films 100, 110, 120, 140 and 150 according to the first to eighth exemplary embodiments instead of the diffusion sheet 196.

In such case, the light emitted from the first and second lamps 191*a* and 191*b* is irradiated onto a display area of the LCD panel after passing through the light guide plate 195, the prism sheet 195, and the diffusion sheet 196 (or any one of the polarizing films 100, 110, 120, 140 and 150 according to the first to eighth exemplary embodiments) in due order. At this time, the light from the prism sheet 195 is corrected through the diffusion sheet 196 (or any one of the polarizing films 100, 110, 120, 140 and 150 according to the first to eighth exemplary embodiments) to compensate deviation of the viewing angle. Therefore, for an image displayed in the LCD panel, the viewing angle in the X-axis direction becomes substantially identical to the viewing angle in the Y-axis direction.

Figure 23:
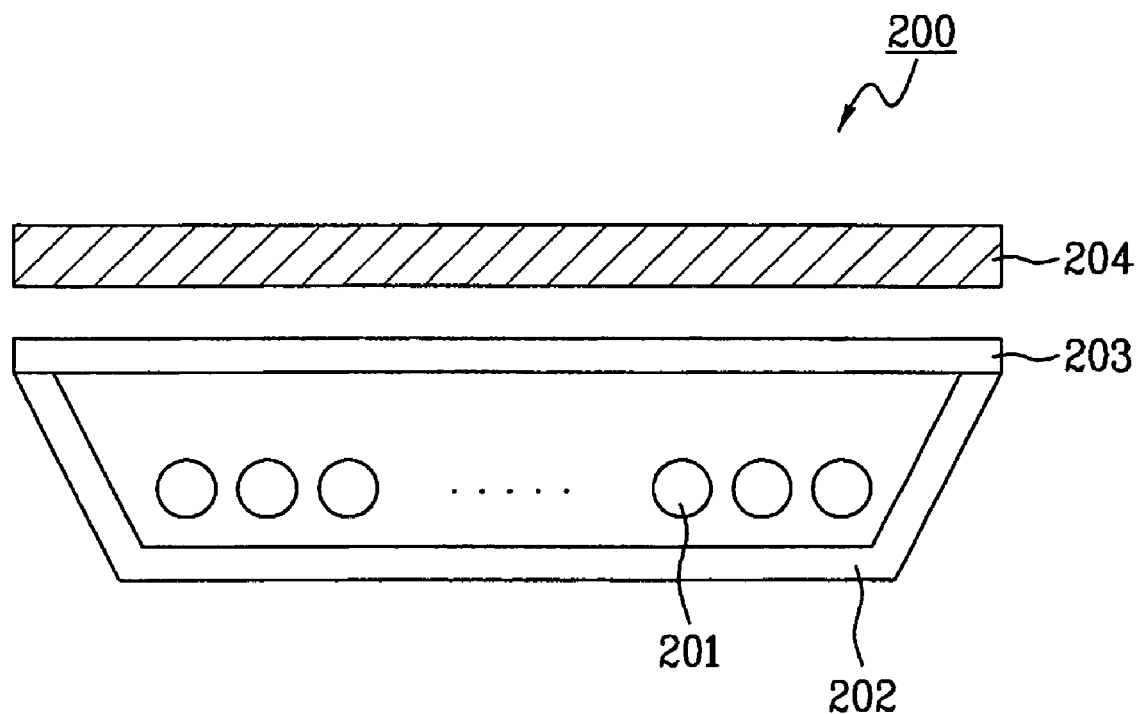
FIG. 23 illustrates a backlight unit according to a third exemplary embodiment of the present invention.

Next, a backlight unit according to a third exemplary embodiment of the present invention will be described with reference to FIG. 23. FIG. 23 illustrates the backlight unit according to the third exemplary embodiment of the present invention.

As shown in FIG. 23, the backlight unit according to the third exemplary embodiment of the present invention includes a plurality of lamps 201 emitting light, a bottom cover 202 receiving and supporting the lamps 201, a reflecting plate (not shown) formed at an inner side of the bottom cover 202, a prism sheet 203 formed on an upper surface of the bottom cover 202, and a diffusion sheet 204 provided with a plurality of diffusion patterns 333*a* and 333*b* diffusing the light emitted from the prism sheet 203 in at least two directions to allow the light to have different strengths. Since the diffusion sheet 204 may be substantially the same as the diffusion sheet 300 shown in FIG. 3, its description will be omitted. Furthermore, the backlight unit 200 according to the third embodiment of the present invention may include any one of the polarizing films 100, 110, 120, 140 and 150 according to the first to eighth exemplary embodiments instead of the diffusion sheet 204.

Here, the light emitted from the lamps 201 is irradiated onto the display area of the LCD panel after passing through the prism sheet 203 and the diffusion sheet 204 (or any one of the polarizing films 100, 110, 120, 140 and 150 according to the first to eighth exemplary embodiments) in due order. At this time, the light from the prism sheet 203 is corrected through the diffusion sheet 204 (or any one of the polarizing films 100, 110, 120, 140 and 150 according to the first to eighth exemplary embodiments) to compensate deviation of the viewing angle. Therefore, for an image displayed in the LCD panel, the viewing angle in the X-axis direction becomes identical to the viewing angle in the Y-axis direction.

As described above, the optical sheet and the backlight unit using the same according to the present invention have a number of advantages. For example, the diffusion sheets are provided with a plurality of diffusion patterns to diffuse the incident light from the prism sheet in at least two directions so that the incident light has different strengths. Therefore, deviation in the viewing angle of the light emitted from prism sheet can be compensated.

It will be apparent to those skilled in the art that various modifications and variations can be made in the optical sheet and the backlight unit using the same of the present invention without departing from the spirit or scope of the invention. Thus, it is intended that the present invention cover the modifications and variations of this invention provided they come within the scope of the appended claims and their equivalents.

What is claimed is:

1. An optical sheet comprising:
   a diffusion sheet provided with a plurality of diffusion patterns diffusing incident light in at least two directions to allow the incident light to have different strengths, wherein the diffusion sheet includes a first diffusion sheet and a second diffusion sheet; and
   a brightness enhancement sheet arranged on at least one side of the diffusion sheet to enhance brightness of light incident thereon,
   wherein each diffusion pattern has an elliptical shape with a longitudinal axis and a short axis, and
   wherein longitudinal axes of each of the respective diffusion patterns are arranged parallel to each other.

2. The optical sheet as claimed in claim 1, wherein each diffusion pattern is formed on either a side of the diffusion sheet where light enters or a side opposite thereof.

3. The optical sheet as claimed in claim 1, wherein the diffusion patterns are made of the same material as the diffusion sheet.

4. The optical sheet as claimed in claim 3, wherein the diffusion sheet and the diffusion pattern are made of any one of polycarbonate, acryl, and polyethylene terephthalate resin (PET).

5. The optical sheet as claimed in claim 1, wherein at least one of the first diffusion sheet and the second diffusion sheet provides substantially uniformly diffused light with respect to the two directions even when the diffusion of the incident light has different strengths with respect to the two directions.

6. The optical sheet as claimed in claim 1, wherein one of the first diffusion sheet and the second diffusion sheet is arranged above the brightness enhancement sheet, and the other is arranged below the brightness enhancement sheet.

7. The optical sheet as claimed in claim 5, wherein the first diffusion sheet providing substantially uniformly diffused light with respect to the two directions includes a plurality of beads formed on opposing sides.

8. The optical sheet as claimed in claim 1, wherein the brightness enhancement sheet includes one of a brightness enhancement film (BEF) and a dual brightness enhancement film (DBEF).

* * * * *